Patented Feb. 14, 1950

2,497,828

UNITED STATES PATENT OFFICE 2,497,828

CONTROLLING POLYMERIZATION REACTIONS

James H. Young, Niagara Falls, N. Y., assignor to E. I. du Pont de Nemours & Company, Wilmington, Del., a corporation of Delaware No Drawing. Application May 22, 1945, Serial No. 595,260

3 Claims. (Cl. 260—89.1)

This invention relates to the preparation of polymers. More specifically, the invention relates to the formation of polymers from polymerizable monomers catalyzed by peroxides or oxygen releasing materials.

It is known that such polymers vary in properties and such systems vary in speed of polymerization when the catalyst concentration is varied. Because of the small amounts of catalysts used and the large amounts of polymers, monomers, dispersing agents and modifiers often present, chemical tests for following the catalyst concentration are difficult to make and the results unreliable.

This is especially true for certain recently proposed and very active polymerizing systems in which a peroxygen compound is promoted with a reducing agent.

One object of this invention is to provide a means and method for controlling peroxide catalyzed polymerizations. A further object is to produce improved polymers by means of a device which so regulates the system that polymer formation proceeds smoothly and evenly.

These objects are accomplished by continuously measuring and if desirable regulating the amount of catalyst present with suitable oxidation-reduction electrodes and a potentiometer or potentiometric controller.

The invention may be further illustrated by the following examples.

Example 1

10 ml. of vinyl acetate was emulsified in 50 ml. of water with 0.5 ml. Avitex AD (a commercial long chain sulfonated alcohol) as dispersing agent. A bare platinum wire spiral and a calomel half cell connected to a potentiometer were used as electrodes to measure the oxidation-reduction potential of the emulsion.

As a reducing promoter 1.0 ml. of 0.2 molar zinc formaldehyde sulfoxylate was added. The potential was −10 mv. 1.0 ml. of 0.2 molar hydrogen peroxide was added as catalyst. The potential was then +110 mv. 2 drops of 0.0095 molar ferric ammonium sulfate was also added as an activator.

Polymerization started immediately raising the temperature from 24.8° to 44.1° C. in six minutes. At this point, there was no further polymerization. The potential was 440 mv. and the pH was 1.7. Vinyl acetate was added and the potential remained at 440 mv. There was no polymerization. The high potential having indicated that hydrogen peroxide was present in excess, 1 ml. of 0.2 m. sulfoxylate was added. The potential was 90 mv. Polymerization started immediately raising the temperature from 30.8° C. to 51.3° C. in 5 minutes. The potential was then 30 mv. and after adding vinyl acetate, it was 20 mv. No polymer formed. The low potential indicated an excess of reducing agent. Accordingly, 1 ml. of 0.2 molar $H_2O_2$ was added. The potential immediately rose from 30 to 200 and gradually to 400 showing only a small amount of sulfoxylate had been present, and so another 1 ml. of 2 molar sulfoxylate was added. The potential was then 70 mv. and polymerization started at once.

Example 2

The following table shows systems to which the method has been applied as in Example 1, so as to maintain conditions desirable for efficient polymer formation, using as electrodes, platinum and a calomel half-cell.

| Monomer Systems | Operating pH Range | Catalyst | Operating Potential Range |
|---|---|---|---|
| Vinyl acetate dispersed in water | 1 to 5 | Hydrogen peroxide and ascorbic acid | About +100 to +250 mv. |
| Methyl methacrylate in water | 1 to 5 | Hydrogen peroxide and zinc formaldehyde sulfoxylate | About 0 to +200 mv. |
| Vinyl cyanide in water | 1 to 5 | Same | About −50 to +150 mv. |
| Vinyl acetate in water | 1 to 5 | Ammonium persulfate and sodium bisulfite | About +50 to +200 mv. |
| Vinyl acetate in water | 1 to 5 | Tertiary butyl hydroperoxide and zinc formaldehyde sulfoxylate | About +25 to +150 mv. |

The invention is not restricted to the foregoing examples, but may be applied to the polymerization of other polymerizable monoolefinic compounds having the group $CH_2=C<$, in the presence of a peroxygen compound or other oxidizing agent as catalyst. Such polymerizable monoolefinic compounds include the vinyl compounds, such as styrene and other vinyl aryls, vinyl esters of carboxylic acids, vinyl esters of inorganic acids including vinyl chloride and other vinyl halides, vinylidene halides, acrylic acid and its derivatives, e. g., chloracrylic acid, methyl methacrylate, acrylonitrile (vinyl cyanide) and the like.

The preferred polymerization catalysts are organic peroxides, peracids and their salts and inorganic peroxides including hydrogen peroxide. These may be activated by addition of various reducing agents, e. g. sulfoxy compounds such as soluble sulfites, formaldehyde sulfoxylate, and the like. In such activated systems, the oxidation-reduction potential can be regulated by relative rates of feed of catalyst and activator into the reaction mixture.

While useful potential ranges have been indicated in the foregoing example and table, such values are relative to other operating conditions. For example, a change in pH will change the oxidation-reduction potentials. It is therefore necessary when applying these controls to the desired system that determination by trial be made so that the upper, lower and operating ranges are known. Thereafter, measurements will make it possible to operate in the desired range and with the requisite catalyst present.

The calomel half cell is primarily a reference electrode only, and the changes in potential largely involve the platinum electrode. Other electrodes such as silver-silver chloride for certain systems which could tolerate a fixed amount of chloride ion could replace the calomel half cell. Tungsten, carbon, antimony and other commonly employed electrodes may replace the platinum electrode. It will be understood that, as described above, the useful potential range must be located by trial.

The electrodes may be continuously immersed in the system or may be intermittently exposed thereto. Known devices may be used together with the potentiometer to regulate the feed of catalyst, so that the entire operaion is automatic. If desired, catalyst may be added only when needed and as shown by reading of the potential or by warning from a bell or light activated by the potentiometer.

With suitable electrodes, operating conditions may vary widely as to temperature, pressure and other reaction conditions.

While the systems are more generally useful in the presence of water, related solvents such as alcohols, or mixtures of these may also be employed whenever the electrode system responds sufficiently to the oxidation-reduction character of the mixture.

The method is a valuable one for controlling the viscosity, molecular weight, solubility and other polymer characteristics which vary with the conditions under which it is prepared and especially those which vary with catalyst concentration.

I claim:

1. A process for polymerizing vinyl acetate in aqueous emulsion in the presence of hydrogen peroxide as catalyst and formaldehyde sulfoxylate as activator therefore characterized in that the relative concentrations of said peroxide and sulfoxylate are controlled in response to measurements of the oxidation-reduction potential of the reaction mixture within a range not exceeding 200 millivolts.

2. A process for polymerizing a vinyl compound in aqueous emulsion in the presence of a peroxygen compound as catalyst and a sulfoxy reducing compound as activator therefor, characterized in that the relative concentration of said peroxygen compound and reducing compound are controlled in response to measurements of the oxidation-reduction potential of the reaction mixture within a range not exceeding 200 millivolts.

3. A process for polymerizing a vinyl ester in aqueous emulsion in the presence of a peroxide as catalyst and a sulfoxylate as activator therefor, characterized in that the relative concentrations of said peroxide and sulfoxylate are controlled in response to measurements of the oxidation-reduction potential of the reaction mixture within a range not exceeding 200 millivolts.

JAMES H. YOUNG.

REFERENCES CITED

The following references are of record in the file of this patent:

UNITED STATES PATENTS

| Number | Name | Date |
|---|---|---|
| 1,684,645 | Smith et al. | Sept. 18, 1928 |
| 1,944,738 | Grebe et al. | Jan. 23, 1934 |
| 2,356,925 | Fryling | Aug. 29, 1944 |
| 2,380,473 | Stewart | July 31, 1945 |